Jan. 25, 1966  P. H. KOCH  3,231,015
GRAPHITE-PLATE HEAT EXCHANGE APPARATUS
Filed May 1, 1963 5 Sheets-Sheet 1

INVENTOR.
Paul H. Koch
BY
*J. P. Moran*
ATTORNEY

Jan. 25, 1966 P. H. KOCH 3,231,015
GRAPHITE-PLATE HEAT EXCHANGE APPARATUS
Filed May 1, 1963 5 Sheets-Sheet 2

Jan. 25, 1966 P. H. KOCH 3,231,015
GRAPHITE-PLATE HEAT EXCHANGE APPARATUS
Filed May 1, 1963 5 Sheets-Sheet 3

Jan. 25, 1966  P. H. KOCH  3,231,015
GRAPHITE-PLATE HEAT EXCHANGE APPARATUS
Filed May 1, 1963  5 Sheets-Sheet 5

United States Patent Office 3,231,015
Patented Jan. 25, 1966

3,231,015
GRAPHITE-PLATE HEAT EXCHANGE
APPARATUS
Paul H. Koch, Akron, Ohio, assignor to The Babcock & Wilcox Company, New York, N.Y., a corporation of New Jersey
Filed May 1, 1963, Ser. No. 277,235
8 Claims. (Cl. 165—134)

The present invention relates to the construction of heat exchange apparatus of the type providing for indirect transfer of heat from one fluid to another, and more particularly relates to the construction and adaptation of a graphite-plate type air heater for such purpose.

In a modern vapor generating unit, the absorption of heat from flue gases resulting from the combustion of fuel within the unit is accomplished by passing the gases in heat exchange relationship over and through heat exchange apparatus such as vapor generating sections, superheaters, economizers, and air heaters. Obviously, the overall thermal efficiency of the vapor generator is a function of the flue gas temperature leaving the unit, and it is well known that the limit of this lower outlet temperature is usually established by the nature and extent of corrosion products present in the flue gas. The corrosion nature of the flue gas at temperatures below its dew point is generally the result of the condensation of water vapor carried by the heating gases flowing in contact with the metallic heat transfer surfaces, combined with the presence of gaseous constituents, such as oxides of sulphur resulting from the combustion of the sulphur-bearing fuel. The corrosion problem is usually concentrated on the "cold end" of the unit, i.e., the portion of the air heater wherein the cold incoming air is in indirect heat exchange relationship with the outgoing flue gas.

Several arrangements have heretofore been proposed and are presently being used to overcome this corrosion problem which is associated with the effort to increase overall unit thermal efficiency by reducing the final flue gas temperature. For example, indirect steam preheaters may be used to increase the temperature of the incoming air prior to its entering the air heater, or hot air from the outlet or "hot end" of the air heater may be mixed with the incoming air to accomplish the same result. These and other known methods all have their obvious drawbacks insofar as improvement in thermal efficiency is concerned since full advantage of the decrease in flue gas outlet temperature cannot be obtained using these methods. Another approach to the corrosion problem has been that of using corrosion resistant materials for constructing the portions of both recuperative and regenerative air heaters that are subject to corrosion. For example, air heaters have been fabricated with glass or porcelain coated tubes in that portion of the air heater adjacent the air inlet, while others have used alloys such as "Corten" in this region. In many such attempts, material and fabrication costs have been excessive while in others, the corrosion resistant materials have proven to be fragile or difficult to satisfactorily incorporate into the overall construction scheme of the unit.

Recent improvements both in the methods of manufacturing and in the physical characteristics of graphite, whereby its cost has been reduced and the limitations as to size and shape have been overcome, have resulted in consideration of graphite as a low temperature corrosion resistant material suitable for use at the cold end of air heaters. Air heater "cells" formed of graphite plates arranged with alternate flow passages for flue gas and air in indirect heat transfer relationship can now be economically manufactured; nevertheless, the problem of incorporating these cells into the overall construction scheme of a conventional type of air heater unit remains to be solved. For example, the use of graphite air heater cells in conjunction with an air heater of the usual type introduces such problems as the method of supporting the cells, provision for differential expansion of the graphite in relation to the casing and connecting ductwork, and the method of joining multiple cells so that graphite air heaters of various sizes and capacities can be made. In the solution of all the problems in adapting the graphite air heater for use in conjunction with the usual recuperative or regenerative air heater, the amount of steel structure in contact with the corrosive gases certainly must be minimized to avoid the dangers of corrosion of the steel support members, the framing and the metallic casing. It is an object of the present invention to provide an air heater having graphite plate elements to avoid the corrosive effect associated with flue gas at temperatures below its dew point. It is a further object of the invention to provide a suitable metallic structure for supporting the graphite plate cells so that they may be advantageously incorporated into the overall structural scheme of a modern vapor generating unit. More specific objects of the present invention are to provide for the differential expansion of the graphite cells in relation to the associated metallic structure, to provide protection from corrosion for the metallic members used to support the graphite cells, and to provide structure whereby each cell can be individually installed and removed from the air heater as a module.

The above objects are accomplished in the present invention by providing an air heater made up of a plurality of modules arranged in spaced side-by-side relationship and supported by a pair of spaced parallel beams. Additionally, the modules are individually connected to an overlying top structure which connects the modules to an expansion joint and associated ductwork. Each air heater module is made up of a graphite cell, a top containment frame and a bottom containment frame. The graphite cell includes a plurality of parallel plates having spacer members disposed therebetween to form alternate gas and air lanes. Containment frames which circumscribe the top and bottom of the graphite cell, are resiliently connected by springs to accommodate thermal expansion of the graphite cell. The associated duct work is arranged and constructed to pass air and flue gas through separate, respective lanes which are at right angles to each other, and to pass air through the spaces between adjacent modules to minimize corrosion of the portions of the containment frame extending therein.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 1:
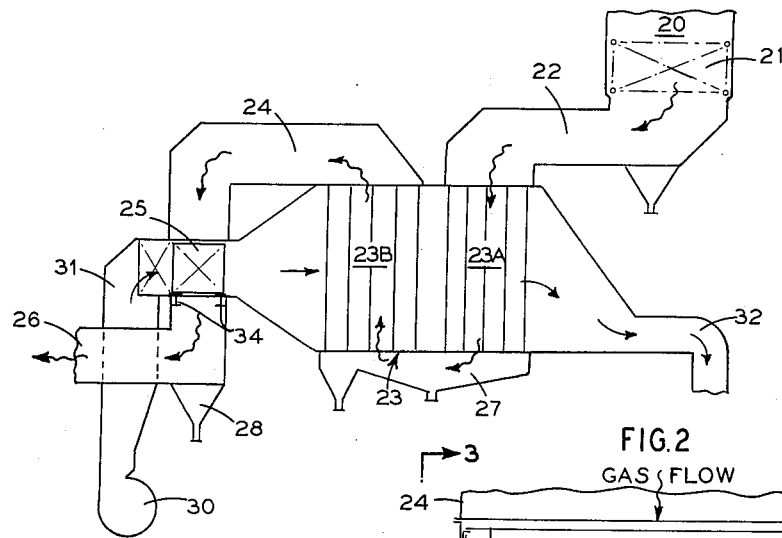
FIG. 1 is a schematic side view of an overall air heater arrangement for a modern vapor generating unit having incorporated therein a graphite air heater of the type herein disclosed.

A modern vapor generator air heating system incorporating a graphite air heater of the type herein disclosed is shown in FIG. 1. In this arrangement hot flue gas from the combustion of fuel in the furnace of the vapor generating unit passes out of the unit after flowing through the convection pass 20 and over the economizer 21. The gas then flows through duct 22 into the main air heater 23, through which it makes two serial passes as indicated by 23A and 23B. The main air heater 23, as here shown for purposes of illustration, is of the tubular type, where the flue gases pass through the tubes while the air to be heated passes in indirect heat transfer relationship around the outside of the tubes. The flue gas then flows through duct 24 to the graphite plate air heater 25, passes downwardly therethrough, and flows out through duct 26 to an exhaust stack (not shown). Ash collection hoppers 27 and 28 are respectively provided under the main air heater 23 and the graphite plate air heater 25. The air to be heated flows through the air heater in substantially counterflow relationship with respect to the flue gas. The air leaves the forced draft fan 30, flows through duct 31, and then passes through the graphite plate air heater 25. The temperature of the air is further increased by passing it through the main air heater 23. After leaving the main air heater 23, the air is conveyed through duct 32 to the burners of the vapor generating unit (not shown), or to other points of use.

It should be recognized that the sole purpose of the graphite air heater 25 is to allow extraction of heat from the flue gas at gas temperatures considerably below those presently encountered when using conventional apparatus such as the main air heater 23. Thus, the working temperature of the gas will be reduced to temperatures below their dew point and entrained chemicals will cause the gases to become corrosive. It should also be recognized that the capital cost of the graphite air heater 25 is higher than the cost of the main air heater 23, when considered on the basis of heat transfer per square foot of surface. Also, in order to more economically utilize the main air heater 23, the graphite air heater 25 must be designed for the minimum unbalanced outlet air temperature necessary to avoid corrosion in the metallic air heater 23. The amount of heat to be extracted from the flue gas in the graphite plate air heater is also determined by economic considerations, i.e., the evaluation placed on the last increment of heat obtained as weighed against the cost of the equipment necessary to obtain this increment. It should also be recognized that the duct 26 and other metallic elements in contact with the flue gas leaving the graphite air heater 25 could be readily protected from corrosion attack by known coatings, as for example tar pitch or corrosion-resistant refractories.

Although the graphite air heater 25 has been described as being used with a tubular type main air heater 23, it is obvious that it also could readily be used in conjunction with any of several types of metallic regenerative or recuperative air heaters to avoid "cold end corrosion" problems.

Figure 2:
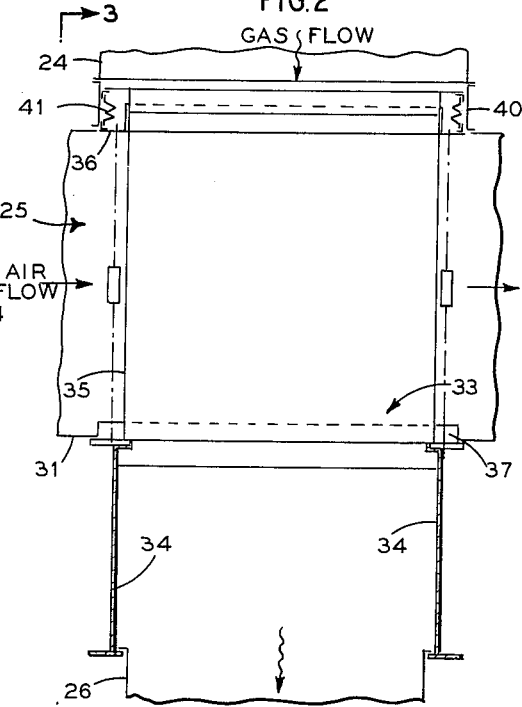
FIG. 2 is an end view of the graphite air heater shown in FIG. 1.

In the end view of the graphite air heater 25, shown in FIG. 2, the flue gas passes from the duct 24 downwardly through the graphite air heater 25 and to the stack (not shown) via duct 26. The air passes from the duct 31 directly through the graphite air heater 25 with its direction of flow at right angles to the downwardly flowing flue gas. Although other flow patterns through graphite plate air heaters of the type herein disclosed can be used and are within the spirit of the invention, the above described flow pattern is preferred since it permits the use of simple connecting duct work and facilitates cleaning of the graphite plates and collection of ash entrained in the flue gas.

Figure 3:
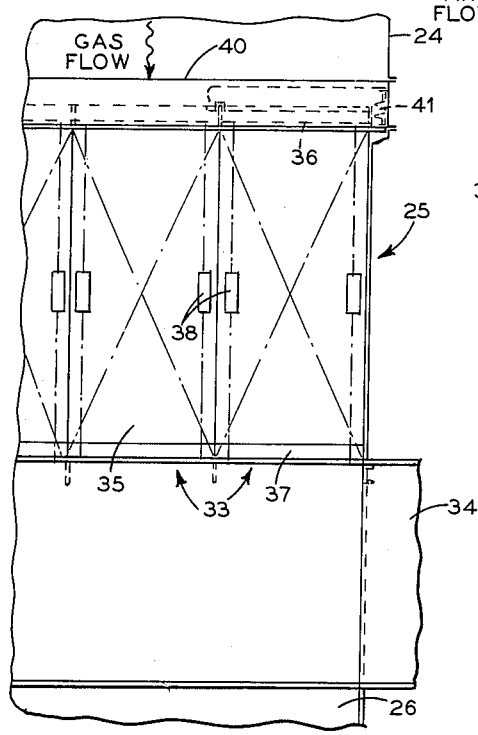
FIG. 3 is a partial front view of the air heater taken along line 3—3 of FIG. 2.

As best shown in FIG. 3, the graphite air heater 25 is made up of a plurality of air heater modules 33 which are arranged in laterally extending side-by-side relationship. As will be hereinafter described, narrow air passages or spaces 42, (not shown in FIG. 3), are provided between the individual modules 33. Each module 33 consists of a graphite cell 35, a top containment frame 36, a bottom containment frame 37, and a plurality of spring ties 38 interconnecting the containment frames 36 and 37, and holding the graphite cell 35 therebetween.

A pair of spaced, parallel lower support beams 34 extend longitudinally under the air heater 25 and are connected to and may, if desired, form a part of the main structural support system (not shown) of the entire air heater assembly shown in FIG. 1. Each of the modules 33 is supported by and individually attached to the beams 34. The modules 33 are also individually attached to a top structure 40, overlying the air heater 25. This top structure 40 is connected to the expansion joint 41 which accommodates relative movement between the air heater 25 and the duct 24 due to the temperature differential between the flue gas and the air which is being heated. It will be understood that the lower support beams 34 and the top structure 40 may be readily incorporated into the overall support structure of the vapor generating unit in which the air heater 25 is to be used.

Figure 4:
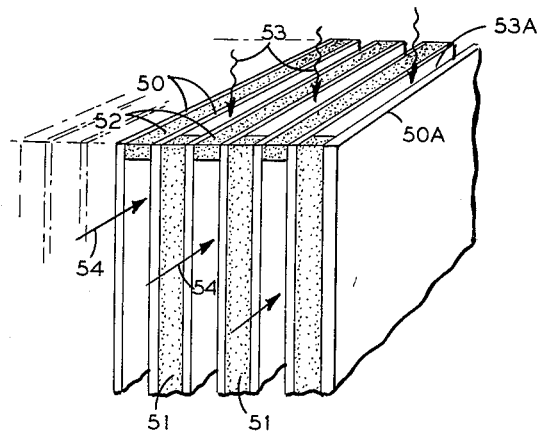
FIG. 4 is an isometric view of a portion of a graphite air heater cell.

The construction of a graphite cell 35, a plurality of which constitutes the heat transfer elements of the air heater 25, is shown in FIG. 4. Each cell 35 is formed of a plurality of spaced, parallel plates 50, arranged to form alternate gas and air lanes 53 and 54, respectively. Vertically disposed gas lane end plates 51, at the front and rear extremities of the cell 35, cooperate with plates 50 to define the gas lanes 53. Horizontally disposed end plates 52 at the top and bottom of the cell 35 cooperate with the plates 50 to define the air lanes 53. For improved heat transfer it should be noted that the outermost lanes 53A of each cell 35 are preferably gas lanes, and for reasons of strength, the outermost plates 50A are thicker than the intermediate plates 50. Additionally, it should be noted that the gas lanes 53 are slightly wider than the air lanes 54 to facilitate cleaning of the gas lanes 53 and to minimize build up of pressure drop therethrough which may be caused by accumulation of ash on the gas sides of the plate 50.

The component parts, i.e., plates 50 and lane end plates 51 and 52 of the graphite cell 35, as shown in FIG. 4, are fused to form a monolithic, gas-tight structure. The cell size is contemplated as being as large as can be economically manufactured and handled. At present, sizes up to about 9 feet high by 9 feet deep by 4 feet wide are feasible, the latter dimension representing the distances between end plates 50A of a cell 35. In an air heater cell of this size, the graphite plates 50 will have a thickness of about ¼ inch. On one particular vapor generating air heater installation, consideration is being given to a graphite air heater having more than thirty such graphite cells 35 arranged in side-by-side relation as shown in FIG. 3.

Figure 5:
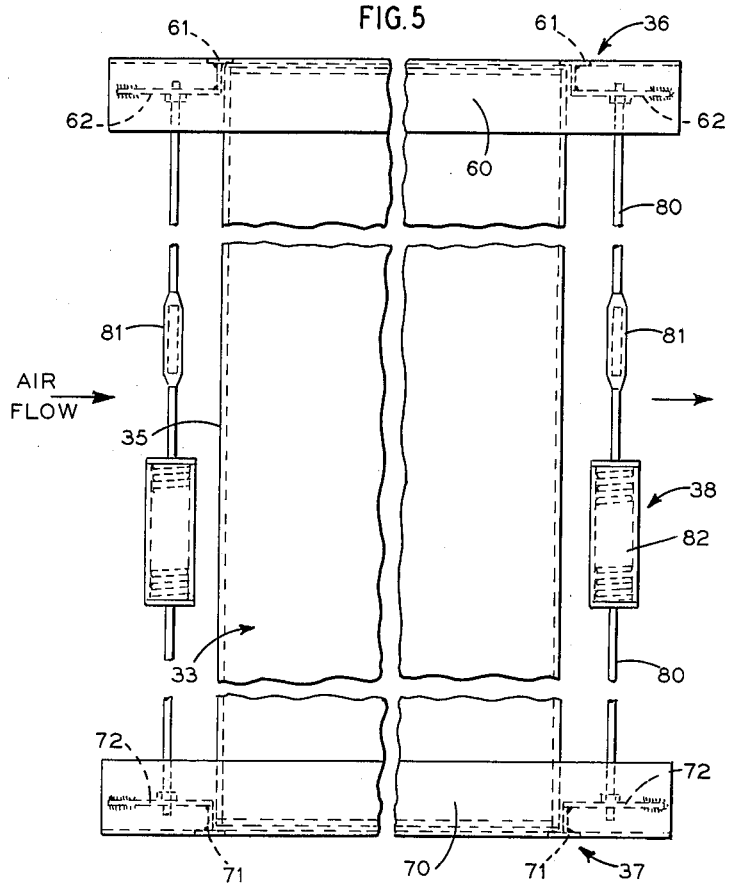
FIG. 5 is a side view of an air heater cell assembly.
Figure 6:
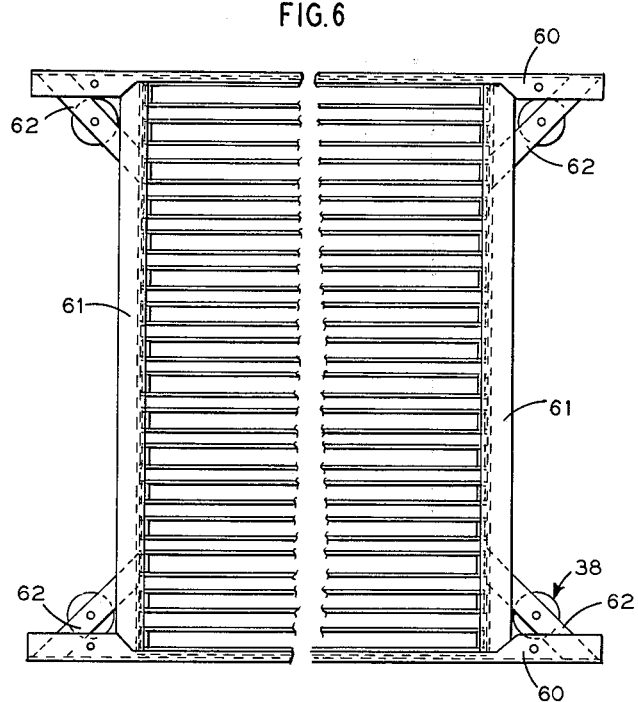
FIG. 6 is a plan view of the air heater cell assembly shown in FIG. 5.
Figure 7:
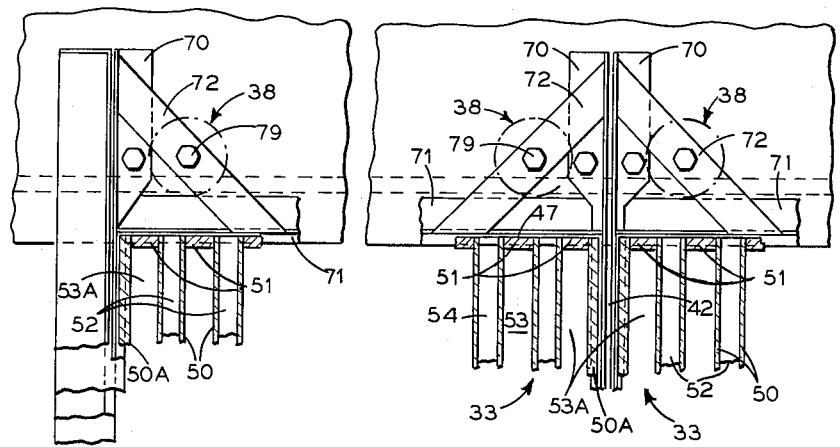
FIG. 7 is a detailed plan view of a portion of the bottom containment framing taken along line 7—7 of FIG. 8.

As best seen in FIGS. 5 and 6, each module 33 includes a graphite cell 35, and top and bottom containment frames 36 and 37, respectively, all held together by spring ties 38. The top containment frame 36 includes a pair of spaced, parallel angles 60 and a pair of spaced, parallel T-section members 61 connected together to form a rectangular frame which fits over the top of the cell 35. The angles 60 lie along the extremities of the depth of the cell 35 and extend slightly over each end, while the T-section members 61 are substantially equal in length to the width of the cell 35 and are connected between the angles 60. The outwardly extending legs of the angles 60 and the T-section members 61 thus form a peripheral band around the sides of the cell 35 at the top, while portions of the horizontal legs of these members form a peripheral cover over the top outer edges of the cell 35. The bottom containment frame 37 is similar in structure to the top containment frame 36, and consists mainly of a pair of spaced angles 70 and a pair of T-section members 71 to form a frame similar to the top frame 36, and fitting over the bottom of the cell 35. The portions of the angles 60 and 70 lying along the top and bottom edges of the graphite cell 35 are cut back (as best shown in FIG. 7) so as not to obstruct flow through the end gas lanes 53A.

Figure 9:
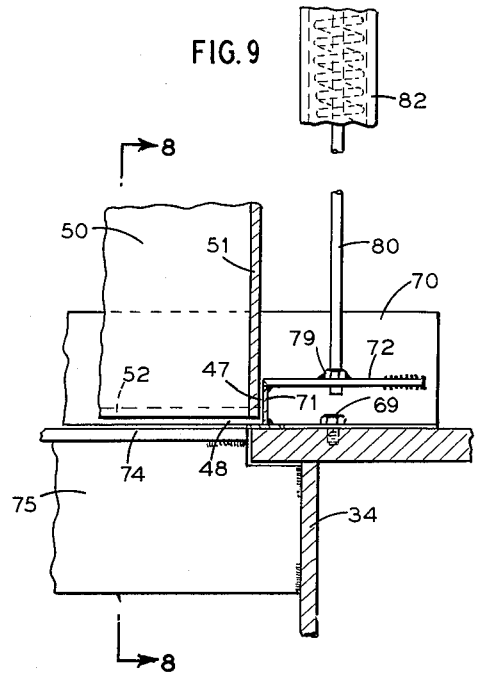
FIG. 9 is a detailed side view of the portion of the bottom containment framing shown in FIGS. 7 and 8.
Figure 11:
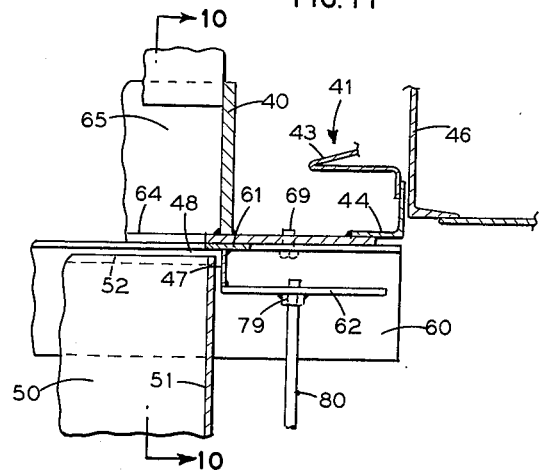
FIG. 11 is a detailed side view of the portion of the top containment framing taken along line 11—11 of FIG. 10.

At each of the corners of the top containment frame 36, a diagonal tie plate 62 (see FIG. 6) is connected between the T-section member 61 and the portion of the angle 60 which extends outwardly past the end of the cell 35. These tie plates 62 are parallel to and slightly below the top of the cell 35. A similar set of tie plates 72 (see FIG. 7) are provided at the four corners of the bottom containment frame 37 for each module 33. A spring tie 38 is suitably connected by nuts 79 between each corresponding upper and lower tie plate 62 and 72, respectively, as shown in FIGS. 9 and 11. Each spring tie 38, as shown in FIG. 5, includes tie rods 80, a turnbuckle 81 and a spring 82. By manipulation of the turnbuckles 81, the tension on the springs 82 may be preset to hold the top and bottom containment frames 36 and 37 in constant engagement with the graphite cell 35. Thus, the spring ties 38 provide an adjustable, resilient connection between the top and bottom containment frames 36 and 37.

The detailed construction features of the top and bottom containment frames 36 and 37 are shown respectively in FIGS. 10 and 11 and FIGS. 7, 8, and 9.

Figure 10:
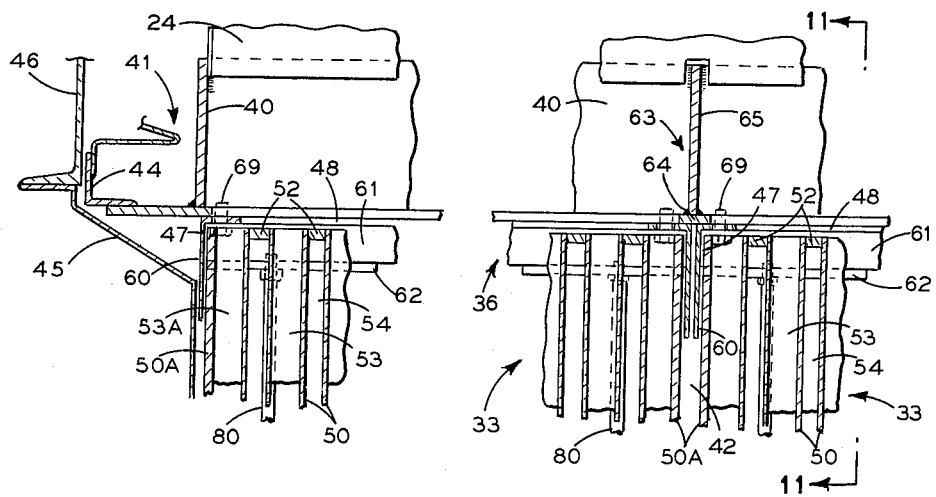
FIG. 10 is a detailed end view of a portion of the top containment framing taken along line 10—10 of FIG. 11.

As best shown in FIGS. 10 and 11, an upper cross member 63, having an inverted T-shaped cross-section, is connected between the parallel longitudinal portions of the top support structure 40 between each pair of adjacent modules 33. Each upper cross member 63 consists of a horizontally disposed plate 64 having its upper surface connected by welding to the lower edge of the upper tie plate 65. The plate 64 overlies the space 42 between adjacent modules 33 and rests against the angles 60 of the adjacent top containment frames 36. The plate 64 thus blocks the flow of flue gas through the space 42 and prevents corrosive attack of the metallic parts therein. Cross members 63 are provided between each adjacent pair of modules 33.

Figure 8:
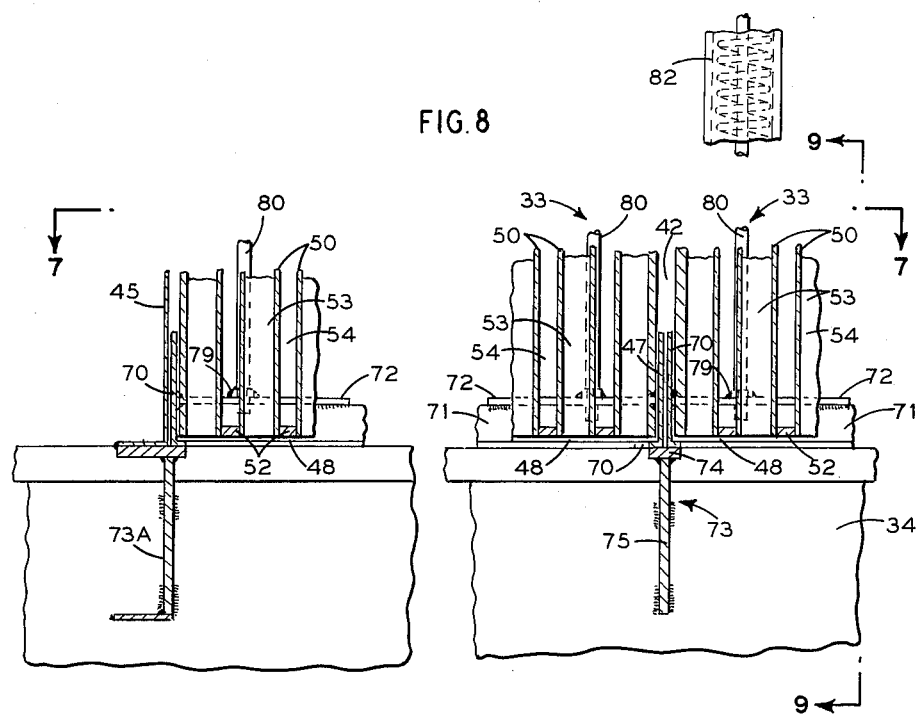
FIG. 8 is a detailed end view of a portion of the bottom containment framing taken along line 8—8 of FIG. 9.

A similar construction is proivded at the lower end of the modules 33, as best shown in FIGS. 8 and 9. The lower cross members 73 are each formed of a horizontal top plate 74 and vertical tie plate 75 welded together to form a T-shaped section. The lower cross members 73 are connected between the parallel lower support beams 34, and as in the above described top construction, the plates 74 underlie the spaces 42 between adjacent modules 33 and prevent flow of corrosive gases therethrough.

It should be noted from FIGS. 8 and 10, that the spaces 42 between the modules 33 are blocked only at their upper and lower ends, and that air is thus allowed to pass horizontally through the open vertical ends of the spaces 42.

Each module 33 is held in place by eight bolts 69, four of which are threaded into the top support structure 40 and connect the extended end portions of the angles 60 thereto, and four of which connect the end portions of the lower angles 70 to the lower support beams 34 in a similar manner. It should be noted that for purposes of easy removal the modules 33 are purposely independently supported and are not connected to each other.

Shown in FIGS. 2, 10 and 11, is a typical camera-fold type expansion joint 41 which allows relative movement between the air heater 25 and the flue gas inlet duct 24. The top support structure 40 to which the expansion bellows 43 is attached through angle irons 44, is formed as a rectangular frame circumscribing the top of the air heater 25. The upper end of the air heater casing 45 connects to the channel 46 which is part of the main structural support steel in the air heater 25. As shown by FIG. 8, the lower end of the casing 45 is welded to the end cross members 73A. The casing 45 is similarly attached at top and bottom on all four sides of the air heater 25 thus providing a gas-tight cover.

It should be noted in FIGS. 7 through 11 that the top and bottom containment frames 36 and 37, do not fit precisely against the graphite cells 35. Side clearance space 47 is provided between the cell 35 and the vertical portions of the containment frames 36 and 37, and end clearance space 48 is provided between the cell 35 and the horizontal portions of the frames 36 and 37. When the modules 33 are made up, as will be hereinafter described, the spaces 47 and 48 are provided with suitable gasket material to effect a seal between the graphite and metallic structure and to cushion impact loads caused by rough handling. Also, the spaces 47 and 48 provide room for slight movements between the graphite cell 35 and the metallic containment frames 36 and 37 caused by the difference in expansion characteristics of the two materials.

Each cell assembly 33 is completely assembled as shown in FIGS. 5 and 6 prior to being installed in the air heater 25. After the top and bottom containment frames 36 and 37 are placed over the ends of the graphite cell 35 with the appropriate sealing gasket in place, the spring ties 38 are connected between the tie plates 62 and 72, and the turnbuckles 81 are adjusted to provide sufficient tension in the springs 82 to insure retention of the cell 35 within the containment frames 36 and 37. When thus assembled, the modules 33 can be readily handled, and it is suggested that they be assembled in this fashion prior to shipment to the erection site. By providing residual tension in the springs 82, it also will be recognized that the top and bottom containment frames 36 and 37 will be kept firmly in contact with the graphite cell even when the cell assembly 33 is heated and the graphite cell 35 expands.

To install the cell assemblies 33 in the air heater, the top support structure 40 should be jacked away from the lower support beams 34, the slack being taken up by the expansion joint 41. The cell assemblies 33 can then be slid into place from the front or rear, and the lower bolts 69 can be threaded into the lower support beams 34. The installation may be completed by lowering the top support structure 40 onto the cell assemblies 33 and connecting the four upper bolts 69 into their tapped openings in the upper support structure 40.

Removal of a single module 33 for purposes of maintenance or replacement, may likewise be accomplished with relative ease. When the top bolts 69 of the adjacent modules 33 are loosened or removed, the top containment framing 40 may be jacked up, and the individual module may be conveniently slid to the front or rear for removal.

While in accordance with the provisions of the statutes, there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. Heat exchange apparatus for the indirect transfer of heat from flue gas of a corrosive nature to air comprising a plurality of graphite air heater cells arranged in side-by-side spaced relationship, means forming air lanes through each of said cells, means forming gas lanes through each of said cells, means for respectively passing flue gas and air through said gas lanes and said air lanes, a structural support system arranged to carry the weight of said cells, individual metallic containment frame means engaged with each of said cells on opposite sides thereof and rigidly connected to said structural support system, and means prohibiting the contact of flue gas with substantially all of the surface area of said containment frame means to prevent corrosion thereof, said last named means including means for passing a portion of said air through said spaces.

2. Heat exchange apparatus for the indirect transfer of heat from flue gas of a corrosive nature to air comprising a plurality of graphite air heater cells arranged in side-by-side spaced relationship, each of said cells being of a monolithic gas-tight construction, means forming air lanes through each of said cells, means forming gas lanes through each of said cells, means for respectively passing flue gas and air through said gas lanes and said air lanes, a structural support system arranged to carry the weight of said cells, individual metallic containment frame means engaged with each of said cells on opposite sides thereof and rigidly connected to said structural support system, and means prohibiting the contact of flue gas with substantially all of the surface area of said containment frame means to prevent corrosion thereof, said last named means including plates connected to said structural support system and enclosing the ends of the spaces between adjacent cells that would otherwise be in communication with the flue gas, and means for passing a portion of said air through said spaces.

3. Heat exchange apparatus for the indirect transfer of heat from flue gas of a corrosive nature to air comprising a plurality of graphite air heater cells arranged in side-by-side relationship, each of said cells being of a monolithic, gas-tight construction and including a plurality of parallel upright plates having spacer members disposed therebetween to form alternate gas and air lanes through said cells, a structural support system arranged to carry the weight of said cells including a pair of parallel support beams extending longitudinally under said cells, individual metallic containment frame means engaged with each of said cells and rigidly connected to said structural support system, said individual containment frame means for each cell including a lower metallic containment frame circumscribing and engaged with the bottom of said cell and being connected to said support beams, an upper metallic containment frame circumscribing and engaged with the top of said cell, and tensioned spring tie means interconnecting said upper and lower containment frames, and means for passing flue gas and air respectively through said gas and air lanes.

4. Heat exchange apparatus for the indirect transfer of heat from flue gas of a corrosive nature to air comprising a plurality of graphite air heater cells arranged in side-by-side spaced relationship, a pair of parallel support beams extending longitudinally under said cells, a top support structure overlying said cells, means for individually supporting each of said cells including a lower metallic containment frame circumscribing and engaged with the bottom of the cell and being connected to said support beams, an upper metallic containment frame circumscribing and engaged with the top of the cell and being connected to said top support structure, and tensioned spring tie means interconnecting said upper and lower containment frames, said upper and lower containment frames having portions thereof extending into the spaces between adjacent cells, means forming air lanes through each of said cells, means forming gas lanes through each of said cells, means for respectively passing flue gas and air through said gas lanes and said air lanes, and means prohibiting the contact of flue gas with substantially all the surface area of said containment frames to prevent corrosion thereof, said last named means including means for passing only air through the spaces between adjacent cells.

5. An air heater for the indirect exchange of heat from combustion flue gas at a temperature below its dew point to air comprising a plurality of graphite cells, each of said cells including a plurality of graphite plates and graphite spacer members disposed between said plates to form alternate air and flue gas lanes, a structural support system arranged to carry the weight of said cells, metallic containment frame means engaged with each of said cells on opposite sides thereof and rigidly connected to said structural support system, and means prohibiting the contact of said flue gas with substantially all of the surface area of said containment frame means.

6. For use in conjunction with a combustion apparatus, an air heating system wherein heat is indirectly transferred from outgoing flue gas to incoming combustion air, said system including a main air heater wherein the temperature of the flue gas is reduced to a level above its dew point, and a heat exchange apparatus for further reducing the temperature of said flue gas to below its dew point, said heat exchange apparatus comprising a plurality of graphite cells, each of said cells including a plurality of graphite plates and graphite spacer members disposed between said plates to form alternate air and flue gas lanes, a structural support system arranged to carry the weight of said cells, metallic containment frame means engaged with each of said cells on opposite sides thereof and rigidly connected to said structural support system, and means prohibiting the contact of said flue gas with substantially all of the surface area of said containment frame means.

7. For use in conjunction with a combustion apparatus, an air heating system wherein heat is indirectly transferred from outgoing flue gas containing condensable oxides of sulphur to incoming combustion air, said system including a main air heater wherein the temperature of the flue gas is reduced to a level above its dew point, and a heat exchange apparatus for further reducing the temperature of said flue gas to below its dew point, said heat exchange apparatus comprising a plurality of graphite air heater cells arranged in spaced side-by-side relationship, each of said cells being of a monolithic gas-tight construction and including a plurality of parallel upright graphite plates having graphite spacer members disposed therebetween to form alternate gas and air lanes at right angles to each other through said cell, a pair of parallel support beams underlying and arranged to carry the weight of said cells extending longitudinally under said cells, a top support structure overlying said cells, means for individually positioning and supporting each of said cells including a lower metallic containment frame circumscribing the bottom of each of said cells and being rigidly connected to said support beams, an upper metallic containment frame circumscribing the top of each of said cells and being connected to said top support structure, and spring tie means interconnecting said upper and lower containment frames for retaining said upper and lower containment frames in engagement with said cells, said upper and lower containment frames having portions thereof extending into the spaces between adjacent cells, means for passing flue gas through said gas lanes, means for passing air through said air lanes and through the spaces between adjacent cells, and means prohibiting the passage of flue gas through the spaces between said cells to prevent corrosion of the portions of said frames extending therein, said last named means including plates covering the ends of said spaces that would otherwise be in communication with the flue gas.

8. For use in conjunction with a combustion apparatus, an air heating system wherein heat is indirectly transferred from outgoing flue gas containing condensable oxides of sulphur to incoming combustion air, said system including a main air heater wherein the temperature of the flue gas is reduced to a level above its dew point, and a heat exchange apparatus for further reducing the temperature of said flue gas to below its dew point, said heat exchange apparatus comprising a plurality of graphite air heater cells arranged in side-by-side spaced relationship, each of said cells being of a monolithic gas-tight construction and having a plurality of parallel plates having spacer members disposed therebetween to form alternate flue gas and air lanes through said cells, a structural support system arranged to carry the weight of said cells, individual metallic containment frame means engaged with each of said cells and rigidly connected to said structural support system, said individually containment frame means for each cell including a lower metallic containment frame circumscribing and engaged with the bottom of said cells, an upper metallic containment frame circumscribing and engaged with the top of said cell, and tensioned spring tie means interconnecting said upper and lower containment frame means, and means prohibiting the contact of flue gas with substantially all the surface area of said containment frame means to prevent corrosion thereof, said last named means including means for passing only air through the spaces between adjacent cells.

References Cited by the Examiner

UNITED STATES PATENTS

| | | | |
|---|---|---|---|
| 1,559,180 | 10/1925 | Prat | 165—166 |
| 2,341,549 | 2/1944 | Helmick | 165—70 X |
| 2,467,935 | 4/1949 | Harper | 165—167 X |
| 2,728,561 | 12/1955 | Hager | 165—166 X |
| 2,735,660 | 2/1956 | Craig | 165—145 X |
| 2,887,303 | 5/1959 | Reys | 165—165 X |
| 2,887,304 | 5/1959 | Hilliard | 165—165 |
| 2,970,811 | 2/1961 | Ruch et al. | 165—134 X |

FOREIGN PATENTS

| | | |
|---|---|---|
| 235,149 | 1/1926 | Great Britain. |

ROBERT A. O'LEARY, *Primary Examiner.*

CHARLES SUKALO, *Examiner.*